J. I. MELLON.

Improvement in Overshoes.

No. 6725 Reissued Nov. 2, 1875

Witnesses:
Fred Haynes
Ferd Busch

Inventor:
J. I. Mellon
By his Attorneys
Brown & Allen

AM. PHOTO-LITHOGRAPHIC CO. N.Y. (OSBORNE'S PROCESS.)

UNITED STATES PATENT OFFICE.

JOHN I. MELLON, OF PANA, ILLINOIS.

IMPROVEMENT IN OVERSHOES.

Specification forming part of Letters Patent No. 132,681, dated October 29, 1872; reissue No. 6,725, dated November 2, 1875; application filed August 29, 1874.

*To all whom it may concern:*

Be it known that I, JOHN I. MELLON, of Pana, in the county of Christian and State of Illinois, have invented certain Improvements in Overshoes, of which the following is a specification:

This invention consists in a combined heelless overshoe-gaiter, which is made to open at the side, with a strap passing around the heel, in combination with an ankle portion so applied that it will hold the heel-strap in its place when the overshoe is on the foot. The invention also includes a strap so applied to the forward portion or toe of the overshoe as to enable force to be much more advantageously exercised in pulling the shoe off the corresponding part of the under boot or shoe than could otherwise be practicable. The invention also includes a novel means of retaining such strap in a snugly close position against the shoe when not under manipulation, for the purpose just specified.

Figure 1:
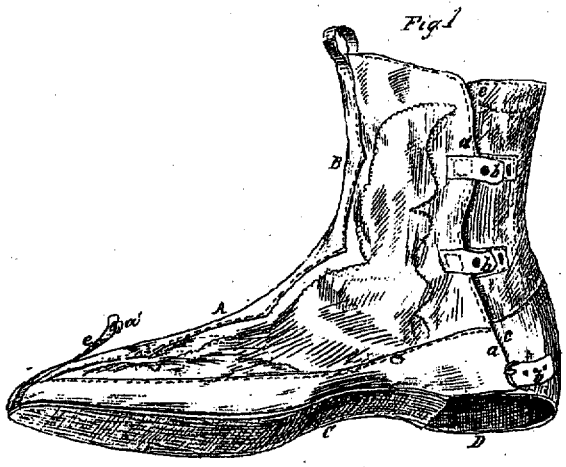
Figure 2:
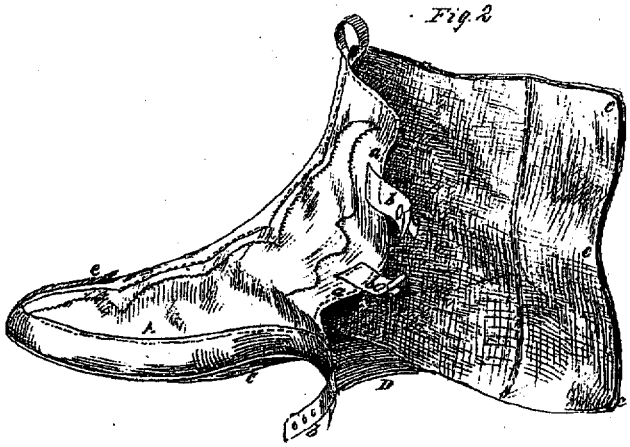

Figure 1 is a side view of an overshoe made according to my invention, showing the same closed as when in actual use upon the foot. Fig. 2 is a similar view, showing the same as opened preliminary to placing the same upon the foot for use.

The combined overshoe and gaiter may be of any ordinary or suitable material, and of any height, length, breadth, or configuration requisite or desired, as indicated in the drawing.

At one side, and midway, or thereabout, of the ankle portion B, the overshoe is vertically divided, the front flap *a* thus formed lapping over the back or opposite one *c*, and furnished with straps *b*, which, in conjunction with buckles or buttons provided in suitable relation upon such back or opposite side or flap *c*, serve to close the opening when the overshoe has been placed in position for use, and to draw and retain the back of the shoe tight around the counter of the boot or shoe work underneath, and at the same time draw the sole of the overshoe snugly up to the breast of the heel of the boot or shoe aforesaid. The sole C is cut away to form an opening, D, for the outward passage or projection of the heel of the boot or shoe worn under the overshoe.

It will be seen by this construction that a combined overshoe and gaiter is formed, which can be readily put on the foot and removed therefrom.

Upon the extreme forward portion or toe of the latter, and on the upper surface thereof, is attached a strap, *e*, the rear end of which is free, and which, being grasped by the hand after the back of the shoe has been removed, enables the overshoe to be pulled with the greatest facility and convenience from the corresponding part of the boot or shoe worn underneath. That portion of the shoe adjacent to the free end of the strap *e* being of more than one ply or thickness, the outermost ply has an eye or orifice formed in it to secure a hook, *a'*, provided on the free end of the strap, said hook serving to retain the strap simply against the shoe when the latter is in ordinary use at the side, as shown in Fig. 2, and hereinbefore set forth, is very readily pulled upon or over the front portion of the boot or shoe of the wearer, the strap *e* being grasped by one hand, as just explained, to facilitate the operation. This done, it is only necessary to bring the rear portion or flap *c* around back of the heel of the under boot or shoe, and buckle or button, as the case may be, to the strap *b* of the other flap *a*, the heel of the under boot or shoe projecting and fitting snugly through the opening D.

By this method of forming the overshoe its application to the foot with the greatest possible ease and convenience to the wearer is assured, at the same time that, the whole of the under shoe or boot, except the heel, being covered, all the purposes of warmth and protection ordinarily sought in an overshoe are fully obtained.

Heelless overshoes have been made prior to my invention; but they are objectionable, on account of the heel-straps dropping down, and allowing the shoes to slip off the feet. This objection is effectually remedied by securing the heel portion to the ankle portion—or, in other words, extending the ankle portion B down as far as the opening D.

I am aware that an elastic opening in the heel end of an overshoe has heretofore been used for the passage of the heel of the inner shoe, and I therefore lay no claim to such invention.

What I claim as new, and desire to secure by Letters Patent, is—

1. As a new article of manufacture, a combined overshoe and gaiter having the sole C, heel-opening D, and vertically-divided ankle portion B, whereof the front flap *a* overlaps the rear flap *c*, and is united thereto by suitable fastenings, substantially as and for the purpose set forth.

2. The strap *e*, attached to the upper forward portion of the overshoe, to enable the portion A to be easily drawn off or on the corresponding part of the inner shoe, as shown and described.

3. The hook *a'*, arranged upon the free end of the strap *e*, and in relation to an eye or orifice formed in the adjacent portion of the overshoe, substantially as set forth.

In testimony that I claim the above I have hereunto subscribed my name in the presence of two witnesses.

JOHN I. MELLON.

Attest:
WM. PATTERSON,
K. M. CARR.